United States Patent

Iwamura et al.

[11] Patent Number: 5,853,231
[45] Date of Patent: Dec. 29, 1998

[54] PRESSURE CONTROL DEVICE

[75] Inventors: Moritaka Iwamura; Toshihiro Hamada; Hiromitsu Ogino, all of Hamakita, Japan

[73] Assignee: Nisshinbo Industries Inc., Tokyo, Japan

[21] Appl. No.: 905,569

[22] Filed: Aug. 4, 1997

Related U.S. Application Data

[63] Continuation of Ser. No. 511,808, Aug. 7, 1995, abandoned.

[30] Foreign Application Priority Data

Aug. 9, 1994  [JP]  Japan .................................. 6-208135

[51] Int. Cl.⁶ ...................................................... B60T 8/36
[52] U.S. Cl. ................................... 303/119.2; 303/119.3; 137/884
[58] Field of Search .............................. 303/119.2, 116.4, 303/113.1, 119.3; 137/884, 596.17; 439/34, 299

[56] References Cited

U.S. PATENT DOCUMENTS

| | | | |
|---|---|---|---|
| 5,040,853 | 8/1991 | Burgdorf et al. | 303/113.1 X |
| 5,127,440 | 7/1992 | Maas et al. | 137/884 |
| 5,326,161 | 7/1994 | Adams et al. | 303/119.2 |
| 5,374,114 | 12/1994 | Burgdorf et al. | 303/119.2 X |
| 5,462,344 | 10/1995 | Jakob et al. | 137/884 X |

FOREIGN PATENT DOCUMENTS

| | | | |
|---|---|---|---|
| 3810788 | 10/1989 | Germany | 303/119.2 |
| 3-501109 | 3/1991 | Japan . | |
| 6-140094 | 5/1994 | Japan . | |
| 92/12878 | 8/1992 | WIPO | 303/119.2 |

*Primary Examiner*—Peter M. Poon
*Attorney, Agent, or Firm*—Nikaido, Marmelstein, Murray & Oram LLP

[57] ABSTRACT

A pressure control device includes a hydraulic unit with a plurality of pressure control valves, a coil unit with a plurality of coils each operating one of the valves, and an electronic controlling unit controlling the coils. Each of the hydraulic unit, the coil unit, and the electronic controlling unit are separately formed. Additional structure is provided to physically and electrically connect the controlling unit and the coil unit.

2 Claims, 5 Drawing Sheets

PRESSURE CONTROL DEVICE

This application is a continuation of application Ser. No. 08/511,808 filed Aug. 7, 1995, now abandoned.

BACKGROUND OF THE INVENTION

Field of the Invention

The present invention relates to a pressure control device. In detail, the pressure control device can be integrally formed with an electronic controller that is equipped in such variable electronic controlling systems such as, an anti-locking braking system (ABS), a traction control system (TCS), an electronic brake force distribution system (EBD), a suspension control system and a pressure control system for an automatic transmission.

Object of the Invention

The object of this invention is to provide a pressure control device which can be optionally designed for different layouts of electronic connectors and has an excellent applicability for expanded functions of an electronic controlling systems.

DETAILED DESCRIPTION OF THE INVENTION

The present invention comprise a hydraulic controlling unit; a pressure control device equipped with a plurality of solenoid valves, a hydraulic pump and an electronic motor and electronic controlling equipment to control the hydraulic unit. A separating type unit is proposed that is constructed such that the hydraulic unit and the electronic controlling equipment are connected with a wired harness while the hydraulic unit is mounted in the engine compartment of the vehicle and the controlling equipment is located in the passenger compartment.

And further, an integrally formed unit is proposed, which assembles the electronic controlling unit to the hydraulic unit so as to reduce the amount of wired harness used.

Traditional pressure control devices that are formed with an electronic controlling equipment have suffered from the following problems:

1. It is difficult to design for the layout of the pressure control devices due to likely interference with surrounding parts. Thus, causing the electronic connector of the electronic controlling equipment to be projected from a side of the hydraulic unit on mounting.

2. The conditions in which the hydraulic unit are to be mounted are restricted. The cost of the units increases because of the need to produce hydraulic units for the respective electronic controlling equipment needed for different installation positions of the electronic connector due to the restricted nature of the space and the different directions of mounting positions with respect to the different types of cars.

3. It is not economical to develop a whole electronic controlling unit in the case of expanding systems of the electronic controlling unit.

The present invention solves these problems by providing a pressure control device, having a pressure controlling unit installed with a plurality of pressure control valves and an electronic controlling unit, to control opening or closing of the pressure control valves. The invention is characterized in that, a coil unit with a plurality of coils, with solenoid valves, is also attached to the outside of the pressure control valves and is attached to an electronic control unit with which a controlling circuit board and with which an electronic connector is separately provided. The controlling board is electronically connected with the coils and the connector respectively and a reattachable electronic control unit and coil unit are integrally connected. Further the electronic control unit and the coil unit are electronically connected with a flexible conductive sheet, and the terminals that extend from the coils are held elastically by piercing through bushings.

Further, a pressure control device is proposed, having a pressure controlling unit installed with a plurality of pressure control valves, and an electronic controlling unit, to control opening or closing of the pressure control valves. The invention is characterized in that it has a coil unit, with a plurality of coils, with solenoid valves, and is attached to the outside of the pressure control valves and is attached to an electronic control unit, within which a controlling circuit board and within which an electronic connector is separately provided. The controlling board is electronically connected with the coils and the connector respectively. A cover is attached to the electronic control unit and the coil unit. The controlling board is attached to an opened portion of the coil unit with the cover and, is integrally formed with the pressure control unit.

Further, a pressure control device is proposed, having a pressure controlling unit installed with a plurality of pressure control valves and an electronic controlling unit, to control opening or closing of the pressure control valves. The invention is characterized in that, the controlling board is pierced between the ECU body and the opposite face of the coil body. Suspending members with wedge-shaped portions on the top of the ends and column shaped members with hooking holes with wedge-shaped portions on the top of the ends being designed respectively to elastically support the ECU. Damping materials are interposed between the controlling board and the hooking portions and being elastically supported. The ECU body and coil body is jointed by being coupled with the supporting members and the column shaped members.

The benefit of the invention as above are as follows:

1. The use of two pieces for the electronic control device, the electronic controlling unit and the coil unit, makes it possible to design of optional layout of the position for fixturing the connector mounted electronic control device.

This allows the pressure control device to be available to all typed cars by avoiding the problem of interfering with the mounted on surroundings.

2. It can be modified to change the electronic control unit the case of expanding the functions of the electronic controlling systems as the invention is constructed with two pieces, the electronic control unit and the coil unit.

3. Two configurations are available. One is the integral formed type and the other is the separated type. The separated type is formed by separating the electronic control unit by way of only changing the coil unit.

4. Using the connectable projections locating the ECU body and coil body make it possible to hold the electronic controlling board and to connect between the electronic control unit and the coil unit at the same time.

DETAILED DESCRIPTION OF THE FIGURES AND PREFERRED EMBODIMENT

The above and other objects and the attendant advantages of the present invention will become readily apparent by reference to the following detailed description when considered in conjunction with the accompanying drawings wherein:

EXAMPLE I

Figure 1:
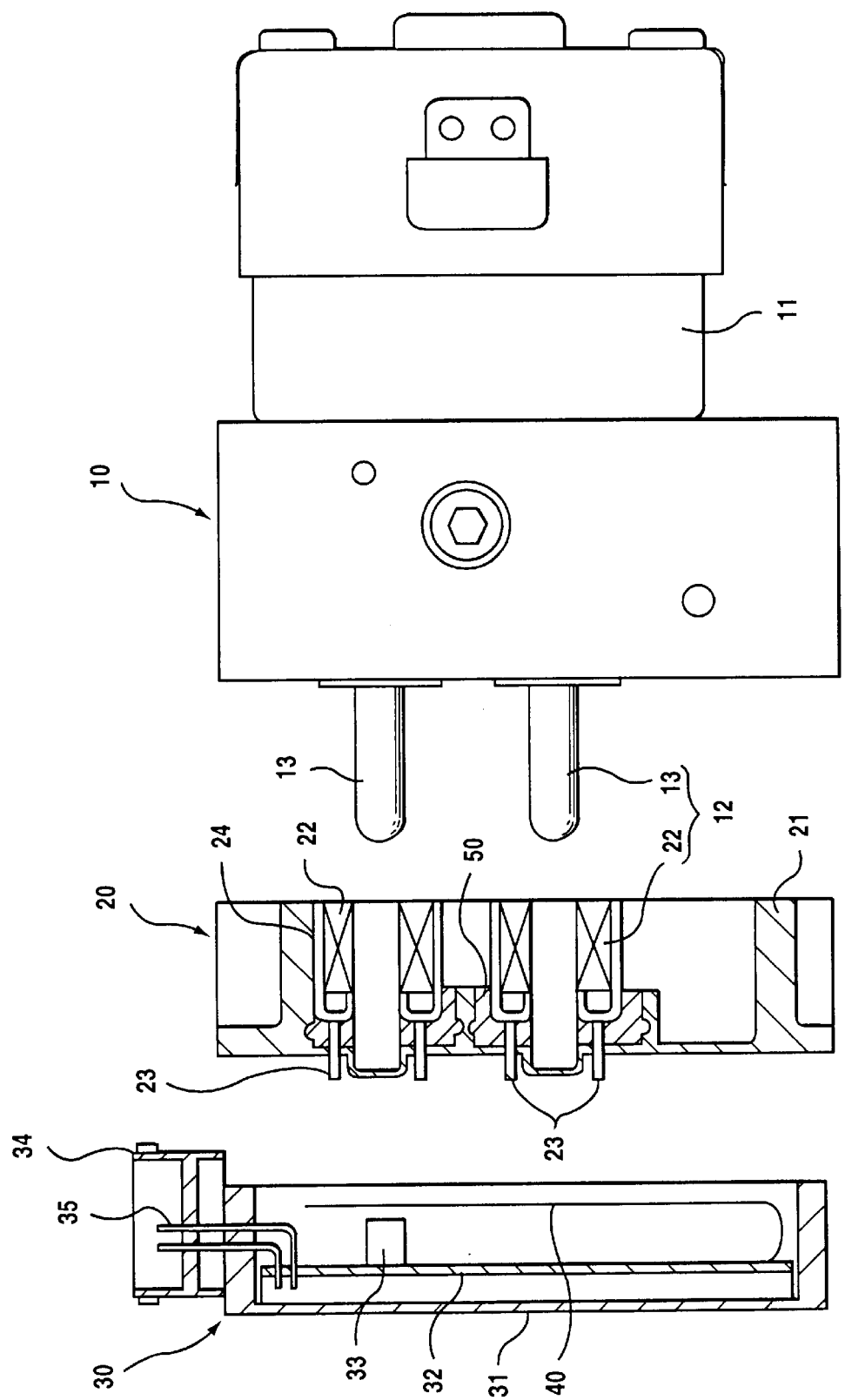
FIG. 1 shows an assembling drawing for the example 1 of pressure control device.

FIG. 1 shows an example of a pressure control device integrated with the electronic controlling equipment.

10 is a hydraulic unit of the pressure control device, 20 is a coil unit and 30 is an electronic controlling unit of the electronic control device.

The control unit is integrally formed to be assembled in order in a joining way, such as with bolts.

This example is also one that may be constructed so as to have a reattachable electronic controlling unit while being separately constructed with the coil unit 20 and the electronic controlling unit 30.

An electronic motor 11 is attached to the back side of the hydraulic unit 10.

A plurality of bores for fixturing the solenoid valves 12 are provided in front of the hydraulic unit. The pressure control valves 13, which is constructed with the solenoid valves 12, are inserted into the bores located on the upper and the lower rows. A hydraulic pump, which is driven by the electronic motor 11 and a plurality of fluid passages and the port connecting to the pipe from the master cylinder are arranged on the upper side of the hydraulic unit 10. The port for connecting with each wheel are located on the upper side as well.

Figure 2:
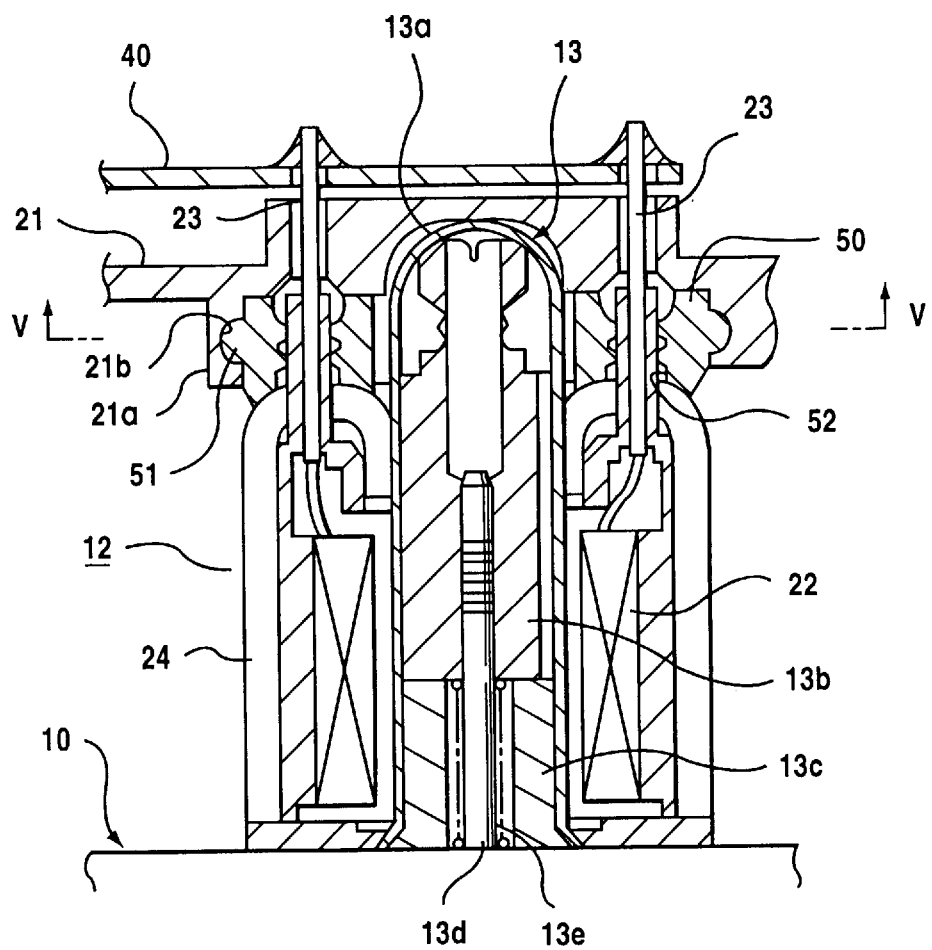
FIG. 2 shows a magnified cross sectional drawing for solenoid valve.

FIG. 2 shows a magnified cross-sectional view of a normally open solenoid valve.

The solenoid valve 12 is comprised of the pressure control valve 13 and cylindrical coil 22. The pressure control valve is constructed with a sleeve 13a shaped like a dome. An armature 13b is installed into the sleeve 13a and the magnet core 13c. The rod 13d is secured in the center of the armature 13b. The armature 13b and the rod 13d are enforced to the direction to open the fluid line by spring force of the spring 13e. When the coil 22 is currented, the excited force makes the armature 13b and the rod 13d move to close the line.

A description of a normally closed valve will be omitted as the description of the normally closed valves has the same basic elements but only differs in the direction of opening and closing.

The coil unit 20 is comprised of the coil body 21, which is made of plastics, and is attached to the front of the hydraulic unit. A plurality of coils 22 are installed within the coil body. The solenoid valves are constructed with coils fixed outside of the pressure control valves.

The coil 22 is made by winding wire around a bobbin and then molding around the wired bobbin with resin. The terminals 23 are connected with both ends of the wire that forms the coil 22. The terminals 23 project to the outside through the top of the yoke 24 covering the coil 22.

FIG. 2 shows an example of fixturing a coil 22 to a coil body 21 by using an annular bushing. Bushing 50 has projections 51 formed in serial or in interval on the outer surface of the bushing. The projections 51 are coupled with depressions 21b, which form the blanket 21a of the coil body 21. The bores 52, for which the terminals 23 are pierced through, are made inside the bushings. A plurality of annular projections, which can hold the terminals 23 are formed inside of the bushing as well. The bushing 50 equalizes the dispersions of fixturing positions for sleeve 13 by pressurely pushing coil 22 to the hydraulic unit 10 with a resilient character.

The electronic controlling unit (ECU) 30 is comprised of the electronic controlling unit body 31, made from plastics, the electronic controlling board 32, inserted into the ECU body 31, and the connector 34, attached to the side of the ECU body 31. The electronic controlling board 32 is arranged with the controlling circuit. A metal connector 35, which is shaped like the letter L, is electronically connected with a portion of the controlling board. Another end of the connector 35 is guided within the connector, and is connected with, for example, a flexible conductive sheet 40 between a pair of terminals 23 that extends from a solenoid valve 12 and the controlling board 32. The conductive sheet 40 is a published flexible plastics sheet on one side of which is printed the circuit. The terminal points of the sheet are connected with the controlling board by soldering. Punched holes in conductive sheet 40 in correspondence to the terminals 23 of the solenoid valves are provided. Each terminal 23 and the circuit on the conductive sheet are electronically contacted with each other by way of inserting the terminals 23 into the holes and then soldered.

One of ordinary skill in the art will recognize that an electronic wire or connector as well may be used and that the present invention is not restricted only to the conductive sheet 40, while it is preferred to use the conductive sheet 40 as a means of contact between the terminals 23 of the solenoid valve 12 and the controlling board 32.

Figure 3:
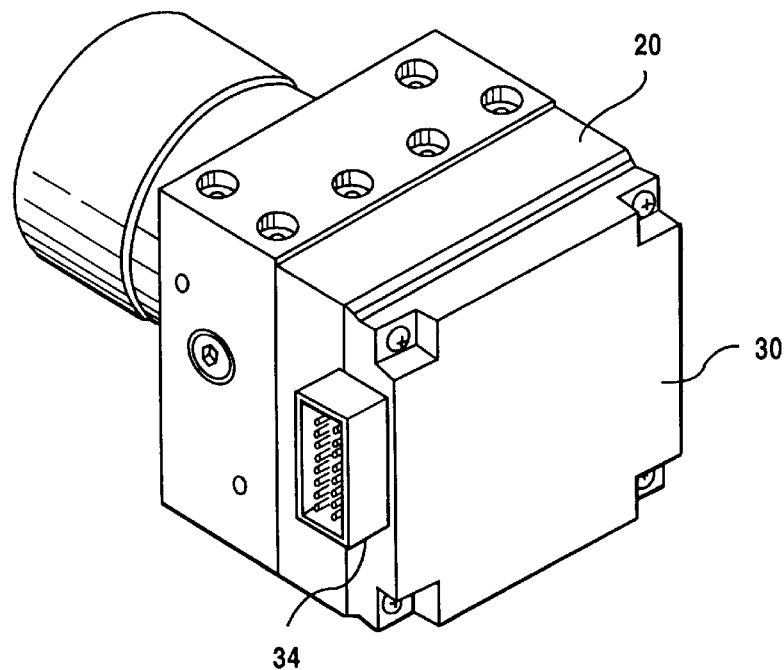
FIG. 3 shows an angled view drawing for pressure control device with a connector turned sideways.
Figure 3:
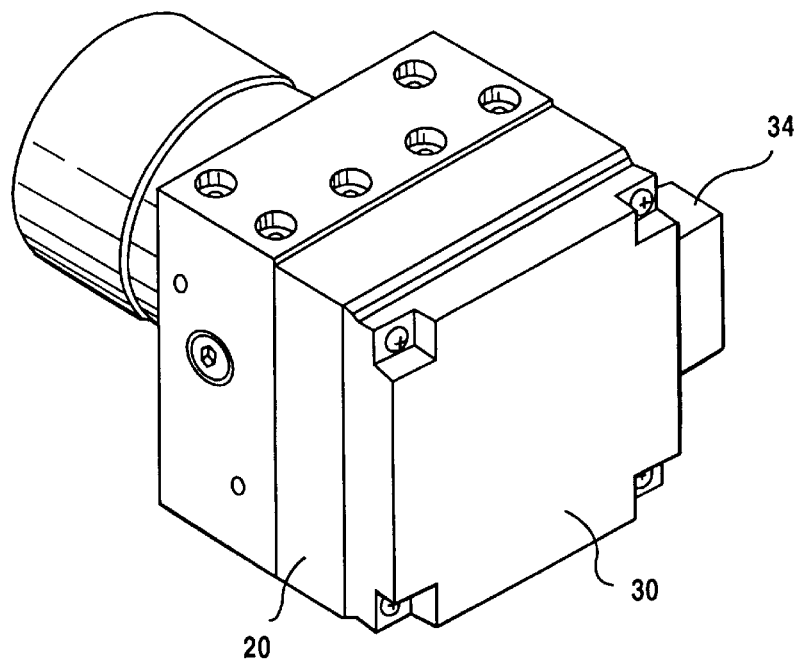

Separation of the coil unit 20 and the electronic controlling unit 30 gives more options in design in the position or angle of the connector 34 fitted with the electronic controlling unit 30 without modifying the coil unit 20. While the connector 34 is illustrated the upturned type as shown in FIG. 1, it can be a well transverse direction type as shown in FIG. 3 (A), (B) and the position or angle of the connector 34 can be laid out in every 90 degree.

It is easier in the design of the position of the connector only to consider the conductive sheet 40. It is enough to use the conductive sheet with the circuit corresponding with each terminal 23 of the coil 22 since the relational positions of the terminals of each solenoid valve are unchanged. In the case of expanded systems of the electronic controlling unit, controlling board 32 or electronic controlling unit 30 may be exchanged.

EXAMPLE 2

Figure 4A:
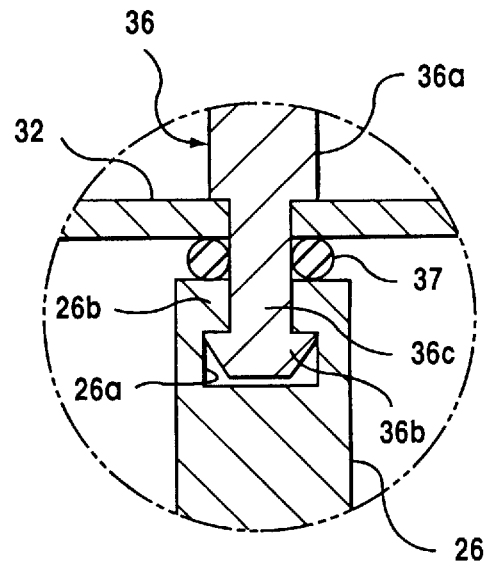
FIGS. 4A and 4B show a main illustrated drawings and a detailed drawing for the mechanism of joining structure between ECU body and coil body.
Figure 4:
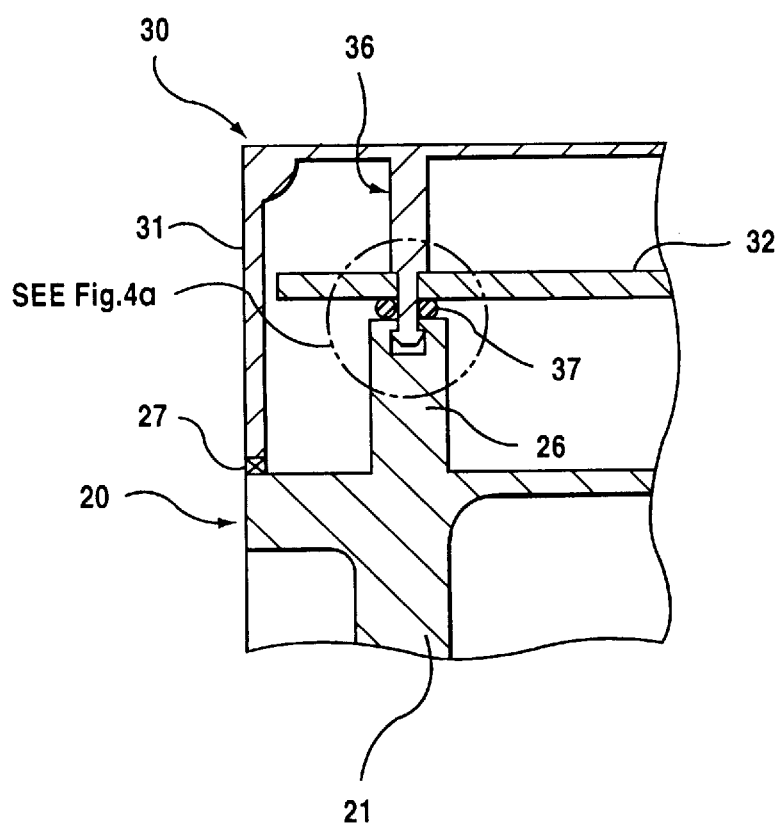

FIG. 4A and 4B show the joint between coil unit 20 and electronic control unit 30. This example proposes a joint mechanism to elastically support the controlling board 32 by using supporting members located with the ECU body and to fasten between electronic control unit 30 (ECU body) and coil unit 20 (coil body 21) at the same time.

Fixed length column members 26 are located on the opposite side of each supporting member 36 with the coil body. Hooking holes 26a, which can be coupled with the wedge shaped portion 36b of the supporting members 36 on the top of the columns 26, are formed. In such structures, after annular damping material 37 is interposed in the neck portions 36c of the supporting members 36 that are pierced into the controlling board, by the wedge portions 36b being coupled with the hooking holes 26a, the conductive sheet 40 is elastically held and supported between the supporting members 36 and the damping material 37. The wedge shaped portions 36b of the supporting members 36 are contacted with the latch portions 26b formed on the entrances of the hooking holes 26a, both 36 and 26 are fastened so as to be coupled with each other.

Furthermore, a higher sealing character in attaching sealing materials 27 along one of both contacted faces of both bodies 31, 21 can be obtained.

The mechanism and structures between the supporting members 36 and column members 26 are one example one of ordinary skill in the art will recognize that alternate joining structures may be used.

Figure 5:
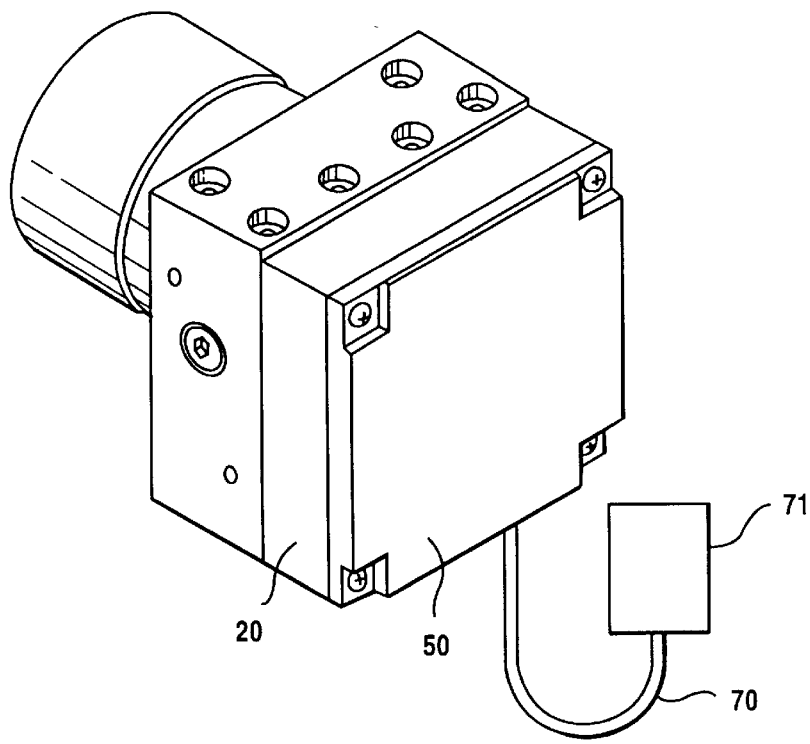
FIG. 5 shows an illustrated drawing for the separated type of example 3.
Figure 6:
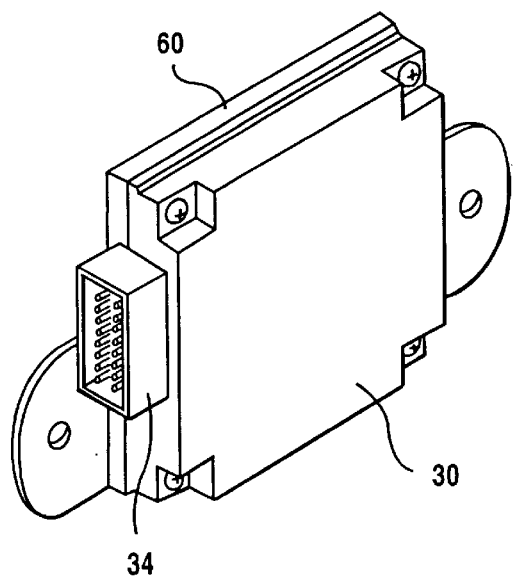
FIG. 6 shows an illustrated drawing for the example 3 attached to the electronic controlling unit with a cover.

A separate type configuration may also be used. A separate type separates only a controlling unit 30 from a hydraulic unit 10 assembled with only a coil unit 20 as shown in FIGS. 5 and 6, while it was described in the integral formed type in the above examples, of which a coil unit 20 and an electronic controlling unit 30 are assembled to a hydraulic unit 10.

In this example, it is necessary to close the portions with extra covers 50, 60 to be attached to the coil unit 20 and the electronic controlling unit 20.

One end of the conductive sheet 40 is supported by the coil cover 50. The separated electronic controlling unit 30 can be connected with the coil unit intermediated with a connector cable 71 end of a cable 70, by means of an electronic cable 70 electronically connected with the conductive sheet 40 being extended from outside of the coil cover 50.

Only attachment of covers 50, 60 makes it possible to use as a separated type without modifying basic components of each unit 10, 20, 30, in this example. It is readily apparent that the above-described has the advantage of wide commercial utility. It should be understood that the specific form of the invention herein above described is intended to be representative only, as certain modifications within the scope of these teachings will be apparent to those skilled in the art.

Accordingly, reference should be made to the following claims in determining the full scope of the invention.

What is claimed is:

1. A pressure control device comprising:
    a hydraulic unit having a plurality of pressure control valves;
    a coil unit having a coil body, and a plurality of coils installed in said coil body, each coil being associated with one of said pressure control valves for operating said valve;
    an electronic controlling unit having an electronic controlling unit body, an electronic controlling board mounted in said electronic controlling unit body and having a controlling circuit thereon for controlling said coils to operate said valves, said controlling circuit being electrically connected to said coils, and a connector electrically mounted on said body and connected to said controlling circuit;
    each of said hydraulic unit, said coil unit, and said electronic controlling unit being separately formed, said coils being attached to an outside of the pressure control valves;
    means for physically, supportingly and electrically connecting said electronic controlling unit and said coil unit; and
    a flexible conductive sheet electrically connecting between said electronic controlling unit and said coil unit.

2. A pressure control device, comprising:
    a hydraulic unit having a plurality of pressure control valves;
    a coil unit having a plurality of coils, each coil being associated with one of said pressure control valves for operating said valve, and a coil unit body, said coil unit body having column members extending from a side of said coil unit body opposite said coils, each column member having a hooking hole in an end thereof furthest from said coils;
    an electronic controlling unit having an electronic controlling board with a controlling circuit thereon for controlling said coils to operate said valves, and an ECU body, said ECU body having depending supporting members equal in number and position with matching column members of said coil unit body, each of said supporting members having a wedge-shaped portion on an end thereof;
    wherein said electronic controlling board is positioned between said ECU body and said coil body, and is supported by being pierced by said supporting members with said wedge-shaped portions and held on a top of said ends of said column members, said wedge-shaped portions of said supporting members being engaged in said hooking holes in said column members; and
    damping material being interposed between the controlling board and said ends of said column members thereby elastically supporting said controlling board between said ECU body and said coil body.

* * * * *